June 3, 1958  C. L. GRAYBILL  2,837,110
FLUID PRESSURE CONTROL VALVE
Filed Sept. 12, 1955
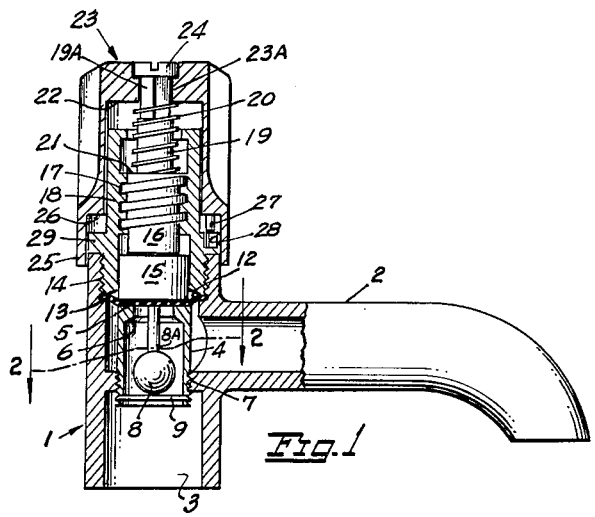
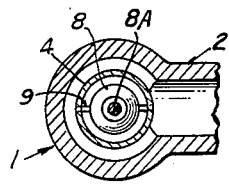
CLINTON L. GRAYBILL
INVENTOR.

United States Patent Office 2,837,110
Patented June 3, 1958

2,837,110

FLUID PRESSURE CONTROL VALVE

Clinton Lee Graybill, Superior, Mont.

Application September 12, 1955, Serial No. 533,801

2 Claims. (Cl. 137—327)

This invention relates to improvements in fluid pressure control valves of the type shown and described in my co-pending application, Serial No. 487,265, filed February 10, 1955.

As therein pointed out, it is one of the objects of the invention to provide a valve of this character which is entirely automatic in closing off the flow of fluid to a fixture when the fixture is opened beyond its normal open position in accordance with my invention.

A further object is to provide a valve wherein its several parts are readily accessible for repair, adjustment or replacement without the use of any tools whatever, and which can be disassembled and reassembled in a minimum amount of time.

A further object is the provision of a valve of this kind which is of simple, efficient, durable and inexpensive construction comprising a minimum number of parts made of simple castings and a minimum amount of machine work.

It is one of the principal objects of the present invention to provide a self-closing valve of this character having its various moving parts so arranged and disposed as to permit of the ready removal of the main valve and valve-actuating stem without the necessity of turning off the fluid in the supply line below the valve, and an improved secondary valve and valve housing which will automatically cut off the flow of fluid through the valve when such parts are removed.

A further object of the present invention is to provide a diaphragm valve cooperating with a valve seat under pressure of a slidable but non-rotatable piston to eliminate friction between the valve stem and the diaphragm valve and also to prevent chattering of the valve on its seat.

The foregoing and other objects will appear as my invention is more fully hereinafter described in the following specification, illustrated in the accompanying drawing, and finally pointed out in the appended claims.

In the accompanying drawing:

Figure 1 is a sectional side view of a valve made in accordance with my invention.

Figure 2 is a sectional plan view taken along the line 2—2 of Figure 1.

Referring now more particularly to the drawing.

The valve housing, generally indicated by reference numeral 1, is in the form of an elongated hollow cylinder provided with an outlet 2 and adapted at its bottom end 3 for attachment, in any approved manner, to a source of fluid under pressure. The outlet is in open communication with the interior of the housing 1 adjacent a hollow ball check-valve housing 4 disposed therein and of less outside diameter than the inside diameter of the valve housing 1. The upper end of the check valve housing is provided with external and internal valve seats 5 and 6, respectively. The check valve housing is externally threaded at its bottom end and thereby removably secured to the interior of the housing at the inlet end 3 thereof by means of threads 7 formed therein. A ball check-valve 8, provided with a vertical stem 8A, is disposed within the housing 4 and retained therein by a pin 9 secured across the bottom end of the housing. The check valve is of less diameter than the inside diameter of its housing 4 to provide space for the passage of fluid therethrough.

Cooperating with the external valve seat 5 on the top end of the check valve housing is a diaphragm valve 12 in the form of a disc of durable, resilient material such as neoprene, or the like, supported by its peripheral marginal edges resting upon an annular shoulder 13 on the interior of the valve housing 1 at the bottom end of an internally threaded portion 14 thereof.

Superimposed upon the diaphragm valve 12 is a piston 15 whose top end is normally in contact with the bottom end of a valve stem 16 threadedly mounted, as at 17, on the interior of the upper end of a housing 18. The bottom end portion of the housing 18 is externally threaded for attachment to the top end of the valve body 1 by means of the internal threads 14 therein. The bottom end of the housing 18 secures the diaphragm valve 12 to the annular shoulder 13 within the housing 1. The upper end of the valve stem 16 is reduced in diameter, as at 19, squared in cross-section as at 19A, and surrounded by a compression spring 20 whose bottom end bears against the shoulder 21 formed in the valve stem by said reduction in diameter and whose top end bears against the end wall 22 of a handwheel 23. The square end 19A of the valve stem extends into a square opening 23A in the end wall of the handwheel for rotation therewith and is provided with a screw 24 for attaching the handwheel to the stem.

The bottom end of the handwheel has a skirt portion 25 extending downwardly from an internal annular shoulder 26 from which depends a pin 27 for selective engagement with a recess 28 formed in an external annular flange 29 formed integral with the housing 18. When assembled, the flange 29 bears against the top end of the housing 1 and the bottom end of the housing 18 bears against the diaphragm valve 12 to secure it in place, as aforesaid.

In operation, fluid will normally be cut off by the seating of the diaphragm valve 12 against its seat 5 on the top end of the ball check-valve housing 4. When it is desired to provide a flow of fluid from the outlet 2, the handwheel 23 is rotated in a counterclockwise direction which will lift the stem 16 away from the piston 15 to enable the piston to move upwardly as the diaphragm valve 12 is forced upwardly from its seat by the fluid pressure against its underside. In this position of the parts, the ball check-valve 8 will be allowed partial movement toward its seat 6 but will be prevented from making contact therewith by its stem 8A whose top end is at all times bearing against the under side of the diaphragm valve.

When it is desired to disassemble the valve, the handwheel 23 is pressed downwardly against the resistance of the compression spring 20 until the pin 27 engages within the recess 28 formed in the flange 29 of the housing 18. Then by rotating the handwheel in a counterclockwise direction the housing 18, rotating in the same direction, will be retracted from its threaded connection 14 with the top end of the main housing 1. Simultaneously therewith, the ball check-valve will instantly seat itself against the seat 6 to automatically cut off the flow of fluid up through the housing 1 and at the same time will force the diaphragm 12 and piston 15 upwardly into a position for easy removal.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

1. A valve of the character described comprising a hollow valve housing having a vertically disposed inlet opening adapted to be connected to a source of supply and a horizontal outlet opening in communication with the interior of the housing, a check valve housing disposed on the interior of the valve housing adjacent said outlet opening and being of lesser outside diameter than the inside diameter of the valve housing to provide an annular space between both of said valve housings, internal and external valve seats being provided at the top end of said check valve housing, a valve in the form of a flexible disc cooperating with said external valve seat, an internally and externally threaded valve stem housing provided with an external annular flange and removably secured by its external threads to the interior of said valve housing with said flange bearing against the top end of said valve housing and its bottom end bearing against the marginal edge of said flexible disc valve, said annular flange having an opening therein, a reciprocatory valve stem threadedly mounted within the valve stem housing for actuating said disc valve against said external valve seat, a ball check-valve of less diameter than and disposed within said check valve housing to provide for the normal passage of fluid therethrough, a pin formed integral with the ball check-valve and in contact with said disc valve at all times to prevent the check-valve from seating against said internal valve seat when said disc is positioned for operation and whereby said check-valve will seat against the internal valve seat when said disc is elevated to a predetermined degree from said external valve seat whereby the check-valve will cut off the flow of fluid from said inlet to the interior of the valve housing and into said outlet, an upwardly biased handwheel slidably attached to said reciprocatory valve stem and adapted to rotate the same, said handwheel having a pin extending downwardly therefrom terminating above said annular flange and adapted upon downward movement of the handwheel along said valve stem to engage within the opening in said annular flange whereby rotation of the handwheel in one direction will correspondingly rotate said valve stem housing to thereby remove the same from its threaded attachment to said valve housing.

2. In a valve including a valve housing having a fluid passageway; the improvement comprising a valve seat in said passageway, an annular shoulder on the interior of the passageway concentrically spaced from said valve seat, a flexible disc valve supported upon said shoulder and cooperating with said valve seat in controlling fluid flow through the passageway, an internally and externally threaded valve stem housing provided with an external annular flange and removably secured by its external threads to the interior of said valve housing with said flange bearing against the top end of said valve housing and its bottom end bearing against the marginal edge of said flexible disc valve, said annular flange having an opening therein, a reciprocatory valve stem threadedly mounted within the valve stem housing for actuating said disc valve against said valve seat, an upwardly biased handwheel slidably attached to said reciprocatory valve stem and adapted to rotate the same, said handwheel having a pin extending downwardly therefrom terminating above said annular flange and adapted upon downward movement of the handwheel along said valve stem to engage within the opening in said annnular flange whereby rotation of the handwheel in one direction will correspondingly rotate said valve stem housing to thereby remove the same from its threated attachment to said valve housing.

References Cited in the file of this patent

UNITED STATES PATENTS

| 1,118,649 | Halter | Nov. 24, 1914 |
| 1,703,861 | Bohnhardt | Mar. 5, 1929 |
| 2,076,805 | Wine | Apr. 13, 1937 |

FOREIGN PATENTS

| 353,954 | France | July 12, 1905 |